(12) United States Patent
VanWingerden et al.

(10) Patent No.: US 10,408,094 B2
(45) Date of Patent: Sep. 10, 2019

(54) VALVE TRAIN CARRIER ASSEMBLY

(71) Applicant: Eaton Corporation, Cleveland, OH (US)

(72) Inventors: Mark VanWingerden, Battle Creek, MI (US); Douglas Nielsen, Marshall, MI (US); James E. McCarthy, Jr., Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/928,512

(22) Filed: Mar. 22, 2018

(65) Prior Publication Data

US 2018/0209309 A1 Jul. 26, 2018

Related U.S. Application Data

(63) Continuation of application No. PCT/US2016/053543, filed on Sep. 23, 2016.
(Continued)

(51) Int. Cl.
*F01L 13/00* (2006.01)
*F01L 1/24* (2006.01)
(Continued)

(52) U.S. Cl.
CPC .............. *F01L 1/2422* (2013.01); *F01L 1/146* (2013.01); *F01L 1/20* (2013.01); *F01L 13/0005* (2013.01);
(Continued)

(58) Field of Classification Search
CPC ......... F01L 1/146; F01L 1/181; F01L 1/2422; F01L 1/26; F01L 1/46; F01L 2001/467;
(Continued)

(56) References Cited

U.S. PATENT DOCUMENTS

2006/0225684 A1* 10/2006 Spath ..................... F01L 1/146
123/90.59
2009/0199803 A1* 8/2009 Hendriksma ........... F01L 1/146
123/90.48

(Continued)

FOREIGN PATENT DOCUMENTS

| JP | S59213914 A | 12/1984 |
|---|---|---|
| JP | 2009127587 A | 6/2009 |

OTHER PUBLICATIONS

International Search Report and Written Opinion for International Application No. PCT/US2016/053543 dated Dec. 14, 2016, 15 pages.

*Primary Examiner* — Jorge L Leon, Jr.
(74) *Attorney, Agent, or Firm* — RMCK Law Group PLC

(57) ABSTRACT

A valve train assembly includes an intake rocker arm, an exhaust rocker arm, a carrier configured to couple to a cylinder block and operably associated with the intake rocker arm and the exhaust rocker arm, the carrier including a first aperture, and a cylinder deactivation (CDA) capsule disposed within the first aperture. The CDA capsule is configured to move between a latched condition that transfers motion from a push rod to one of the intake rocker arm and the exhaust rocker arm, and an unlatched condition that absorbs motion from the push rod and does not transfer the motion to the intake rocker arm or the exhaust rocker arm.

11 Claims, 4 Drawing Sheets

Related U.S. Application Data

(60) Provisional application No. 62/233,294, filed on Sep. 25, 2015, provisional application No. 62/318,519, filed on Apr. 5, 2016.

(51) Int. Cl.

| | | |
|---|---|---|
| *F02D 13/06* | (2006.01) | |
| *F02D 41/00* | (2006.01) | |
| *F01L 1/14* | (2006.01) | |
| *F01L 1/20* | (2006.01) | |
| *F02D 13/02* | (2006.01) | |
| *F01L 1/08* | (2006.01) | |

(52) U.S. Cl.
CPC ......... *F02D 13/0203* (2013.01); *F02D 13/06* (2013.01); *F02D 41/0002* (2013.01); *F02D 41/0087* (2013.01); *F01L 1/08* (2013.01); *F01L 2001/2444* (2013.01); *F01L 2013/001* (2013.01); *F01L 2013/105* (2013.01); *F02D 2041/001* (2013.01); *F02D 2041/0012* (2013.01); *Y02T 10/18* (2013.01); *Y02T 10/42* (2013.01)

(58) Field of Classification Search
CPC ............. F01L 13/0005; F01L 2013/001; F01L 13/0031; F02D 13/0203; F02D 13/06; F02D 2041/0012; F02D 41/0087
USPC ............ 123/90.16, 90.38, 90.39, 90.4, 90.61
See application file for complete search history.

(56) References Cited

U.S. PATENT DOCUMENTS

| | | | |
|---|---|---|---|
| 2012/0067312 A1 | 3/2012 | Lee | |
| 2016/0123193 A1* | 5/2016 | Patterson | ................. F01L 1/34 123/90.16 |

* cited by examiner

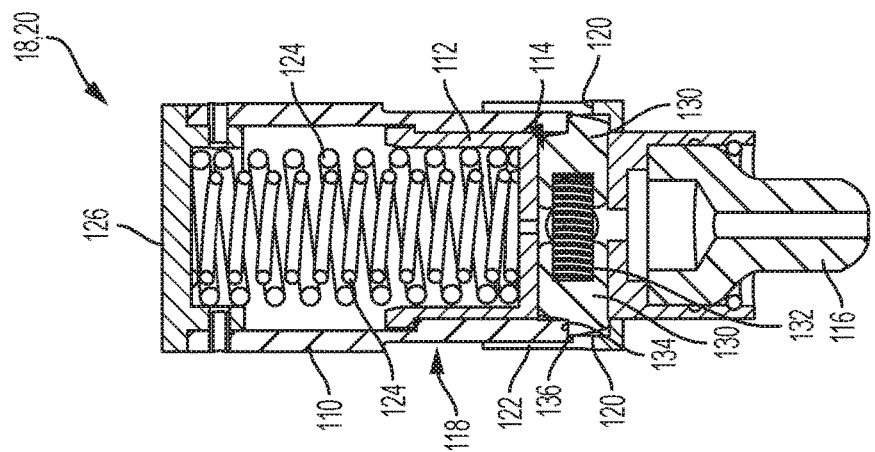
FIG. 5
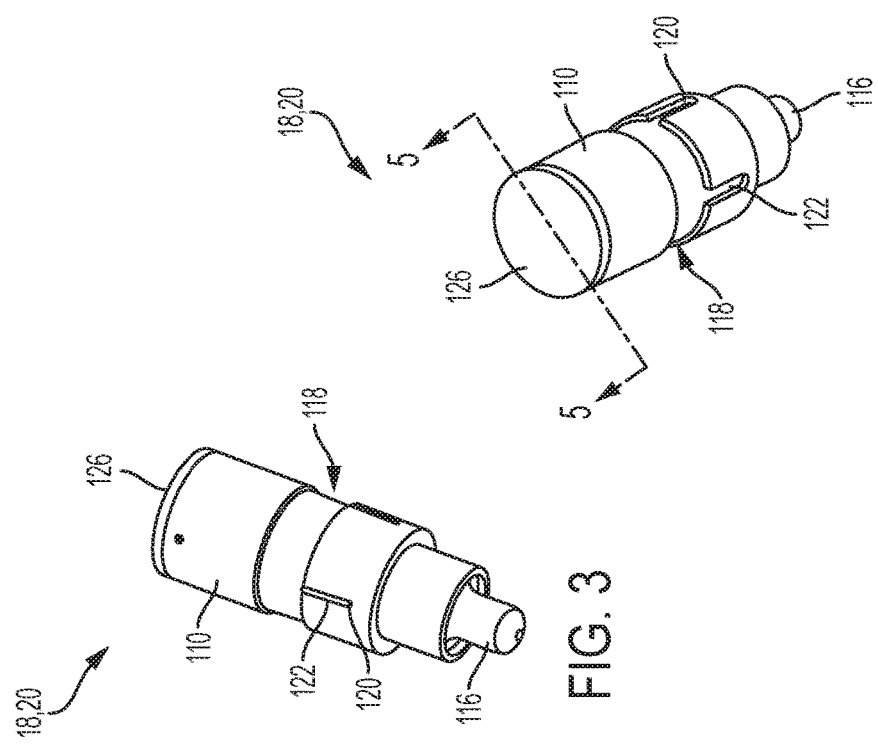
FIG. 4
FIG. 3

VALVE TRAIN CARRIER ASSEMBLY

CROSS-REFERENCE TO RELATED APPLICATIONS

This application is a continuation of International Application No. PCT/US2016/053543 filed Sep. 23, 2016, which claims the benefit of U.S. Provisional Application No. 62/233,294 filed Sep. 25, 2015, and U.S. Provisional Application No. 62/318,519 filed Apr. 5, 2016. The disclosures of the above applications are incorporated herein by reference.

FIELD

The present disclosure relates to a valve train carrier assembly and, more particularly, to a valve train carrier assembly that incorporates cylinder deactivation capsules.

BACKGROUND

Some internal combustion engines can utilize rocker arms to transfer rotational motion of cams to linear motion appropriate for opening and closing engine valves. Deactivating rocker arms incorporate mechanisms that allow for selective activation and deactivation of the rocker arm. In a deactivated state, the rocker arm may exhibit lost motion movement. However, conventional valve train carrier assemblies must be often modified to provide a deactivating rocker arm function, which can increase cost and complexity. Accordingly, while conventional valve train carrier assemblies with deactivating rocker arms work for their intended purpose, there remains a need for an improved valve train carrier assembly with deactivating rocker arms.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect of the present disclosure, a carrier for a valve train assembly having an intake rocker arm and an exhaust rocker arm, is provided. The carrier includes a first aperture configured to receive a first cylinder deactivation (CDA) capsule associated with the intake rocker arm, a second aperture configured to receive a second CDA capsule associated with the exhaust rocker arm, and a third aperture configured to receive a fluid control device. The third aperture is fluidly coupled to the first aperture and the second aperture such that the fluid control device can selectively supply a pressurized fluid to the first and second CDA capsules to transition them between a latched position and an unlatched position.

In addition to the foregoing, the described carrier may include one or more of the following features: a first support wall, a second support wall, and a support flange extending between the first support wall and the second support wall; wherein the first, second, and third apertures are formed in the support flange; wherein the first support wall includes a body having a shaft aperture configured to receive a fixed shaft, and a plurality of apertures each configured to receive a fastener; and wherein the second support wall includes a body having a shaft aperture configured to receive the fixed shaft, and a plurality of apertures each configured to receive a fastener.

In another aspect of the present disclosure, a cylinder deactivation (CDA) capsule for a valve train assembly having an intake rocker arm, an exhaust rocker arm, and a carrier having an aperture formed therein to receive the CDA capsule is provided. The CDA capsule includes an outer body, a plunger at least partially received within the outer body, the plunger configured to translate within the outer body, and a latching mechanism operably associated between the outer body and the plunger. The latching mechanism is selectively movable between a latched position that facilitates preventing relative movement between the plunger and the outer body, and an unlatched position that facilitates relative movement between the plunger and the outer body.

In addition to the foregoing, the described CDA capsule may include one or more of the following features: wherein the latching mechanism includes a pair of opposed pins and a biasing mechanism disposed therebetween; wherein each opposed pin includes a pin shoulder configured to abut against a shoulder of the outer body when the latching mechanism is in the latched position; wherein the outer body includes a fluid port configured to provide a supply of fluid to the opposed pins to move the latching mechanism from the latched position to the unlatched position; wherein the outer body includes a fluid communication groove formed therein, the fluid communication groove in fluid communication with the fluid port; a biasing mechanism disposed between the plunger and the outer body, the biasing mechanism configured to absorb motion of the plunger within the outer body when the latching mechanism is in the unlatched position, to thereby provide a lost motion feature; and wherein the biasing mechanism comprises a first spring and a second spring.

In yet another aspect of the present disclosure, a valve train assembly is provided. The valve train assembly includes an intake rocker arm, an exhaust rocker arm, a carrier configured to couple to a cylinder block and operably associated with the intake rocker arm and the exhaust rocker arm, the carrier including a first aperture, and a cylinder deactivation (CDA) capsule disposed within the first aperture. The CDA capsule is configured to move between a latched condition that transfers motion from a push rod to one of the intake rocker arm and the exhaust rocker arm, and an unlatched condition that absorbs motion from the push rod and does not transfer the motion to the intake rocker arm or the exhaust rocker arm.

In addition to the foregoing, the described valve train assembly may include one or more of the following features: wherein the carrier further includes a second aperture, the CDA capsule is a first CDA capsule, and further comprising a second CDA capsule disposed within the second aperture; wherein the carrier further includes a third aperture fluidly coupled to the first and second apertures to selectively supply a fluid to the CDA capsules; further comprising an oil control valve disposed within the third aperture; wherein the third aperture is fluidly coupled to the first aperture and the second aperture such that the oil control valve can selectively supply a pressurized fluid to the first and second CDA capsules to transition them between the latched position and the unlatched position; wherein at least one of the first and second CDA capsules comprises an outer body, a plunger at least partially received within the outer body, the plunger configured to translate within the outer body, and a latching mechanism operably associated between the outer body and the plunger, the latching mechanism selectively movable between a latched position that facilitates preventing relative movement between the plunger and the outer body, and an unlatched position that facilitates relative movement between the plunger and the outer body; wherein the latching mechanism includes a pair of opposed pins and a biasing mechanism disposed therebetween; wherein each opposed pin includes a pin shoulder configured to abut against a shoulder of the outer body when the latching mechanism is in the latched position; and wherein the first CDA capsule is operably associated with the intake rocker arm, which is operably associated with a bridge configured to push on at least one intake valve, and wherein the second CDA capsule is operably associated with the exhaust rocker arm, which is operably associated with a bridge configured to push an at least one exhaust valve.

BRIEF DESCRIPTION OF THE DRAWINGS

The present disclosure will become more fully understood from the detailed description and the accompanying drawings, wherein:

FIG. 3 is a perspective view of an example cylinder deactivation (CDA) capsule that may be used in the valve train arrangement shown in FIGS. 1 and 2;

FIG. 4 is another perspective view of the CDA capsule shown in FIG. 3;

FIG. 5 is a cross-sectional view of the CDA capsule shown in FIG. 4 and taken along line 5-5.

DETAILED DESCRIPTION

Figure 1:
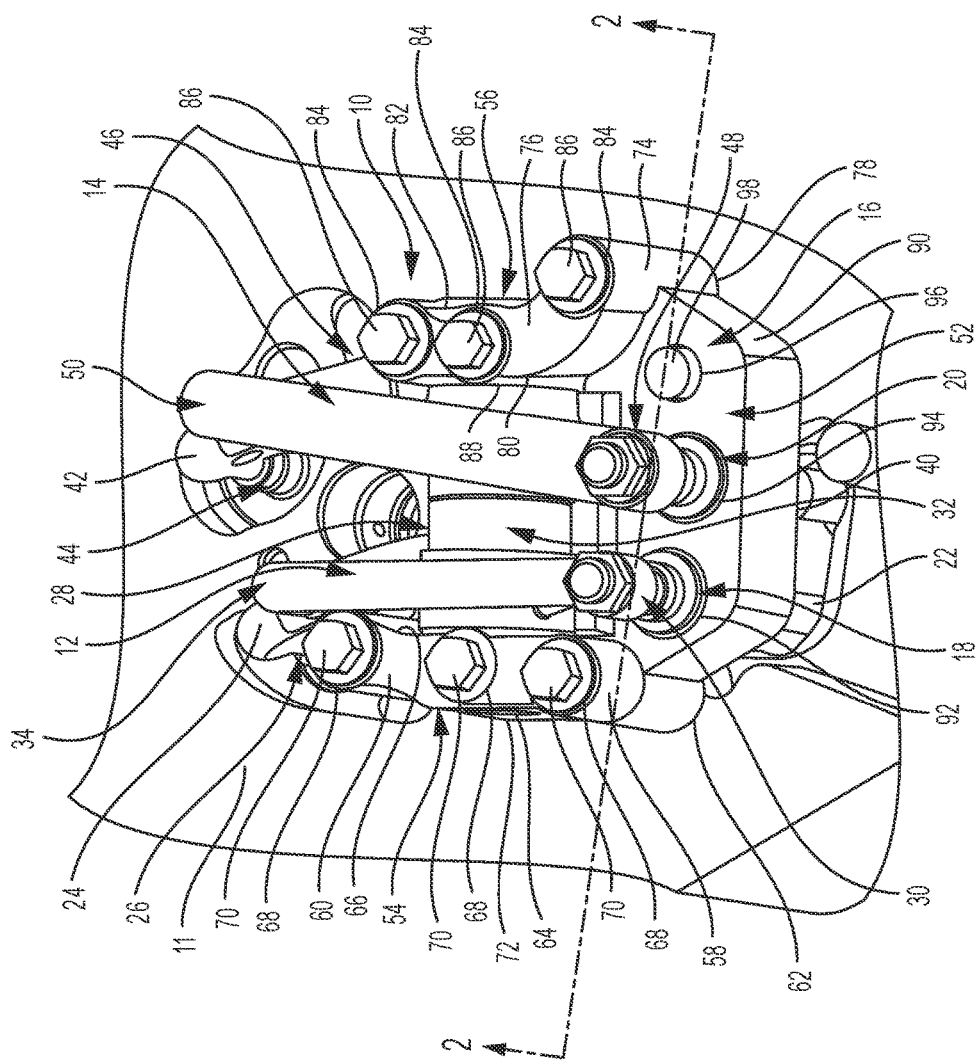
FIG. 1 is a perspective view of an example Type V valve train arrangement having an example valve train carrier.
Figure 2:
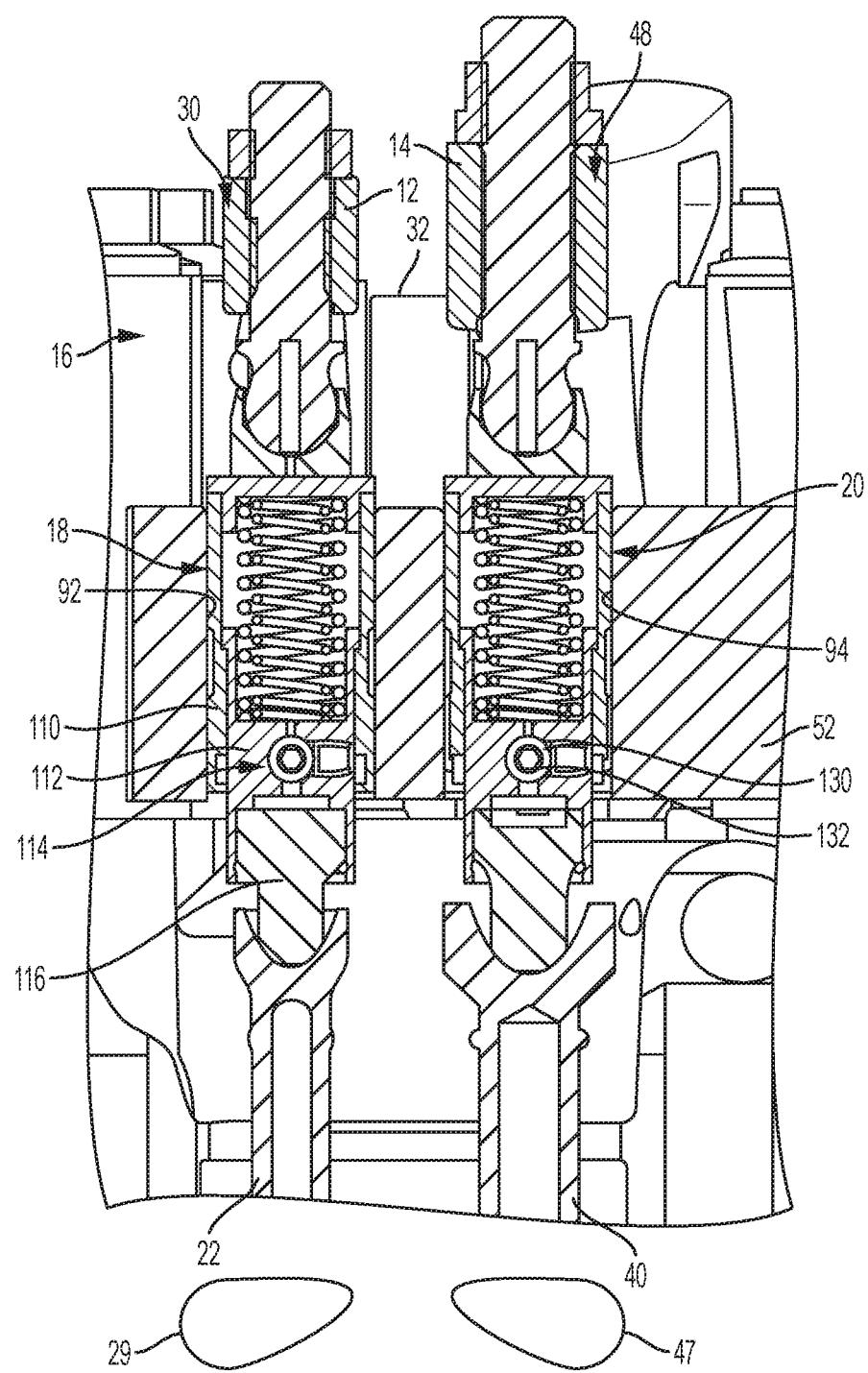
FIG. 2 is a cross-sectional view of the valve train arrangement shown in FIG. 1 and taken along line 2-2.

With particular reference to FIGS. 1 and 2, a Type V valve train arrangement 10 is shown positioned on a cylinder block 11. It will be appreciated that while shown in a Type V arrangement, it is within the scope of the present disclosure for the various features described herein to be used in other arrangements. In this regard, the features described herein associated with the valve train arrangement 10 can be suitable to a wide variety of applications. The valve train arrangement 10 can generally include an intake rocker arm 12, an exhaust rocker arm 14, a valve train carrier 16, a first cylinder deactivation (CDA) capsule 18, and a second CDA capsule 20.

The intake rocker arm 12 is associated with an intake push rod 22, the first CDA capsule 18, a valve bridge 24, and intake valves 26, 28. A first cam lobe 29 is schematically illustrated in FIG. 2 and configured to indirectly drive a first end 30 of the intake rocker arm 12 via intake push rod 22. This pivots the intake rocker arm 12 about a fixed shaft 32, thereby causing a second end 34 of the intake rocker arm 12 to press the valve bridge 24 and actuate the valves 26, 28. As described herein in more detail, the first CDA capsule 18 can be selectively deactivated to prevent actuation of the valves 26, 28 via the intake push rod 22.

The exhaust rocker arm 14 is associated with an exhaust push rod 40, the second CDA capsule 20, a valve bridge 42, and exhaust valves 44, 46. A second cam lobe 47 is schematically illustrated in FIG. 2 and configured to indirectly drive a first end 48 of the exhaust rocker arm 14 via exhaust push rod 40. This pivots the exhaust rocker arm 14 about fixed shaft 32, thereby causing a second end 50 of the exhaust rocker arm 14 to press the valve bridge 42 and actuate the valves 44, 46. As described herein in more detail, the second CDA capsule 20 can be selectively deactivated to prevent actuation of the valves 44, 46 via the exhaust push rod 40.

In the example implementation, the valve train carrier 16 generally includes a support flange 52 extending between a first support wall 54 and a second support wall 56. First support wall 54 includes a body 58 having an upper surface 60, a lower surface 62, and opposed side walls 64 and 66. A plurality of apertures 68 are formed in body 58 and are configured to receive a fastener 70 (e.g., a bolt) to facilitate coupling valve train carrier 16 to cylinder block 11. A shaft aperture 72 is formed in body 58 and is configured to receive shaft 32 therethrough.

Second support wall 56 includes a body 74 having an upper surface 76, a lower surface 78, and opposed side walls 80 and 82. A plurality of apertures 84 are formed in body 74 and are configured to receive a fastener 86 (e.g., a bolt) to facilitate coupling valve train carrier 16 to cylinder block 11. A shaft aperture 88 is formed in body 74 and is configured to receive shaft 32 therethrough.

In the example implementation, support flange 52 includes a body 90 having a first aperture 92, a second aperture 94, and a third aperture 96 formed therein (see FIG. 1). The first aperture 92 can receive the first CDA capsule 18, the second aperture 94 can receive the second CDA capsule 20, and the third aperture 96 can receive an oil control valve (OCV) 98 (FIG. 1). The third aperture 96 is in fluid communication with the first and second apertures 92, 94 such that OCV 98 can supply oil (or other fluid) thereto to selectively deactivate first and second CDA capsules 18, 20, as described herein in more detail.

With additional reference to FIGS. 3-5, first and second CDA capsules 18, 20 will be described in more detail. In some embodiments, CDA capsules 18, 20 are utilized in a diesel engine in order to increase exhaust temperature for exhaust thermal management when the exhaust is below a predetermined temperature, and improving engine fuel efficiency during low load operation. As capsules 18 and 20 are similar, only CDA capsule 18 will be described. In the example implementation, CDA capsule 18 can generally include an outer body 110, a plunger 112, a latching mechanism 114, and a ball pivot 116.

Outer body 110 includes an oil communication groove 118 in fluid communication with a plurality of oil ports 120 via a plurality of oil channels 122. Plunger 112 is disposed at least partially within outer body 110 and is configured to selectively slide within the outer body 110 when CDA capsule 18 is in an unlatched position (not shown). Ball pivot 116 is received within the plunger 112, and the ball pivot 116 is configured to interface with the push rod 22 (see FIG. 2). One or more biasing mechanisms 124 (e.g., a spring) can be disposed between the plunger 112 and a cap 126 to absorb upward motion of pushrod 22 when CDA capsule 18 is in the unlatched position, and the cap 126 can provide a sliding interface with the rocker arm 12. The biasing mechanism 124 can be configured to bias the plunger 112 outward from outer body 110 and absorb motion of the push rod 22 when the CDA capsule 18 is in the deactivation mode, thereby providing a lost motion feature.

Thus, when in an activated or latched position (FIG. 5), the CDA capsule 18 acts as a unitary body and transfers motion from the push rod 22 to the end 30 of rocker arm 12. In contrast, when the CDA capsule 18 is in the deactivated or unlatched position, upward movement of push rod 22 causes the plunger 112 to slide upward within outer body 110. The biasing mechanism 124 subsequently absorbs the upward motion of push rod 22 without transferring said motion to the rocker arm 12.

In the example implementation, the latching mechanism 114 is configured to selectively move between the latched position (FIG. 5) and the unlatched position (not shown). In the latched position, plunger 112 is prevented from movement relative to the outer body 110. In the unlatched position, plunger 112 is movable within and relative to the outer body 110.

As shown in FIGS. 2 and 5, latching mechanism 114 includes a pair of opposed pins 130 having a biasing mechanism (e.g., a spring) 132 arranged therebetween. The biasing mechanism 132 is configured to bias pins 130 away from each other and outward toward outer body 110. As such, when oil is not supplied to oil ports 120, biasing mechanism 132 biases pins 130 outward such that a shoulder 134 of each pin 130 is disposed adjacent a shoulder 136 of outer body 110. In this way, upward movement of plunger 112 is prevented by pin shoulder 134 abutting against outer body shoulder 136, and the upward movement is transferred to outer body 110 and thus rocker arm 12.

However, when a signal is received to transition CDA 18, 20 to the unlatched position, OCV 98 provides a supply of oil to oil ports 120. The force of the supplied oil against pins 130 overcomes the biasing force of biasing mechanism 132, and the pins 130 move toward each other. As such, pin shoulders 134 are moved out of engagement with outer body shoulders 136, thereby enabling upward movement of plunger 112 within outer body 110 where biasing mechanisms 124 subsequently absorb the upward motion of push rod 22 and prevent transfer of the motion to the rocker arm 12. Although a particular latching mechanism 114 configuration is shown in FIGS. 2-5, it will be appreciated that the latching mechanism 114 can have various configurations that enable valve train assembly 10 to function as described herein. For example, in one alternative configuration, latching mechanism 114 can include an electromagnetic actuator (not shown) configured to receive a controller signal to selectively retract and deploy a latching device (e.g., pins 130) to enable and disable the CDA function, thereby obviating a hydraulic system and OCV 98.

Figure 6:
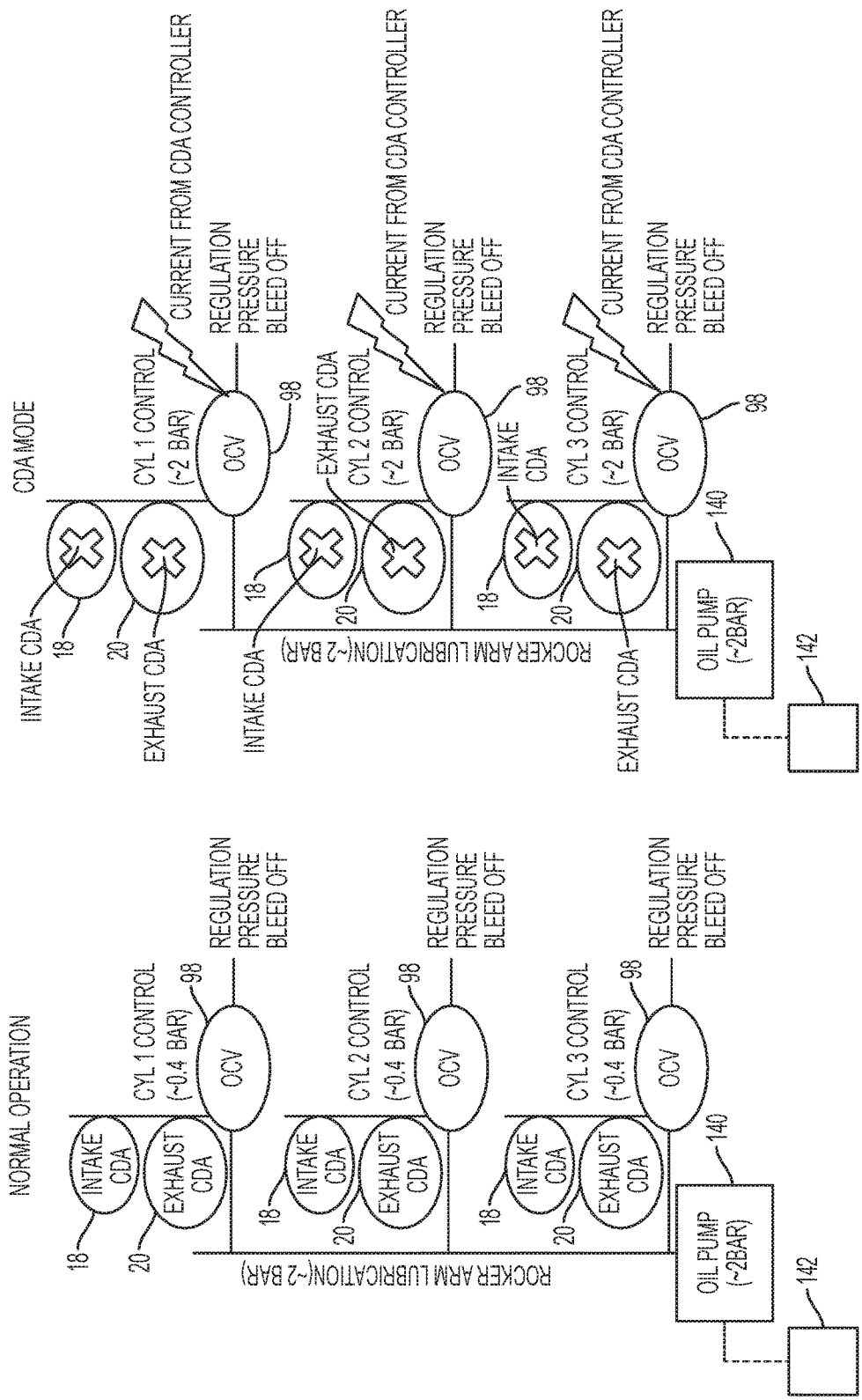
FIG. 6 is a schematic diagram of an example oil flow control of the valve train arrangement shown in FIG. 1.

FIG. 6 illustrates a schematic diagram for an example control of the CDA capsules 18, 20 in a normal operation (latched position) and a cylinder deactivation mode (unlatched position). As shown, in the normal operation, a pump 140 supplies fluid to a plurality of OCV's 98. However, in the normal operation, OCV's 98 do not supply the pressurized fluid to the CDA capsules 18, 20. When switching to the cylinder deactivation mode, a signal is sent from an ECU or controller 142 to the OCV's 98, and the OCV's subsequently supply the pressurized fluid to the CDA capsules 18, 20. The CDA capsules 18, 20 are then switched to the unlatched position to allow lost motion.

Described herein are systems and methods for providing cylinder deactivation to a valve train carrier assembly. A carrier includes a pair of bores to receive cylinder deactivation (CDA) capsules, which are each arranged between a push rod and a rocker arm. The carrier includes a third bore to receive an oil control valve to selectively supply oil to the CDA capsules and transition the CDA capsules between a latched position and an unlatched position. In the latched position, pins extend into abutting arrangement with an outer body of the CDA capsule to enable transfer of motion from the push rod to the rocker arm. In the unlatched position, supplied oil retracts the pin and enables relative movement of CDA capsule components and absorption of the push rod motion, thereby preventing transfer of motion from the push rod to the rocker arm.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A carrier for a valve train assembly having an intake rocker arm and an exhaust rocker arm, the carrier comprising:
    a first support wall having a first support wall body that is configured to be coupled to an engine block, a support flange extending from the first support wall and having a support flange body that defines:
        a first aperture configured to receive a first cylinder deactivation (CDA) capsule associated with the intake rocker arm;
        a second aperture configured to receive a second CDA capsule associated with the exhaust rocker arm; and
        a third aperture configured to receive a fluid control device, wherein the third aperture is fluidly coupled to the first aperture and the second aperture such that the fluid control device selectively supplies a pressurized fluid to the first and second CDA capsules to transition the first and second CDA capsules between a latched position and an unlatched position.

2. The carrier of claim 1, further comprising:
    a second support wall having a second support wall body; and
    wherein the support flange extends between the first support wall and the second support wall.

3. The carrier of claim 2, wherein the first support wall has a shaft aperture configured to receive a fixed shaft, and a plurality of apertures each configured to receive a fastener.

4. The carrier of claim 3, wherein the second support wall has a shaft aperture configured to receive the fixed shaft, and a plurality of apertures each configured to receive a fastener.

5. A valve train assembly comprising:
    an intake rocker arm;
    an exhaust rocker arm;
    a carrier configured to couple to a cylinder block and to support the intake rocker arm and the exhaust rocker arm, the carrier including a first aperture, a second aperture, and a third aperture;
    a first cylinder deactivation (CDA) capsule disposed within the first aperture, the first CDA capsule configured to move between a latched condition that transfers motion from a push rod to one of the intake rocker arm and the exhaust rocker arm, and an unlatched condition that absorbs motion from the push rod and does not transfer the motion to the intake rocker arm or the exhaust rocker arm; and
    a second CDA capsule disposed within the second aperture;
    wherein the third aperture is fluidly coupled to the first and second apertures to selectively supply a fluid to the first and second CDA capsules.

6. The assembly of claim 5, further comprising an oil control valve disposed within the third aperture.

7. The assembly of claim 6, wherein the oil control valve selectively supplies a pressurized fluid to the first and second CDA capsules to transition the first and second CDA capsules between the latched condition and the unlatched condition.

8. The assembly of claim 7, wherein at least one of the first and second CDA capsules comprises:
   an outer body;
   a plunger at least partially received within the outer body, the plunger configured to translate within the outer body; and
   a latching mechanism operably associated between the outer body and the plunger, the latching mechanism selectively movable between a latched position that facilitates preventing relative movement between the plunger and the outer body, and an unlatched position that facilitates relative movement between the plunger and the outer body, wherein the latching mechanism includes a pair of opposed pins and a biasing mechanism disposed between the pair of opposed pins, wherein each opposed pin includes a pin shoulder configured to abut against a shoulder of the outer body when the latching mechanism is in the latched position.

9. The assembly of claim 5, wherein the first CDA capsule is operably associated with the intake rocker arm, which is operably associated with a bridge configured to push on at least one intake valve, and
   wherein the second CDA capsule is operably associated with the exhaust rocker arm, which is operably associated with a bridge configured to push an at least one exhaust valve.

10. The assembly of claim 5, wherein the first CDA capsule is operably associated with the intake rocker arm, which is configured to push on at least one intake valve, and
    wherein the second CDA capsule is operably associated with the exhaust rocker arm, which is configured to push on at least one exhaust valve.

11. The assembly of claim 5, wherein the carrier is configured for one of a single cylinder and for multiple cylinders.

* * * * *